United States Patent Office 3,019,256
Patented Jan. 30, 1962

---

3,019,256
PROCESS FOR PRODUCING ACRYLIC ACID ESTERS
Jesse T. Dunn, Charleston, W. Va., assignor to Union Carbide Corporation, a corporation of New York
No Drawing. Filed Mar. 23, 1959, Ser. No. 800,979
7 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl catalyst, or other catalysts such as the complex triphenylphosphine-nickel halide compounds or the complex nickel halide-quarternary ammonium compounds.

It has now been found that the complex combinations obtained by the admixture of a nickel halide with a nitrogen-containing phenol or naphthol are excellent catalysts for the production of acrylic acid esters. The suitable phenols or naphthols contain a nitroso radical (—NO), or an amino radical (—NH₂) or lower alkyl substituted amino radical (—NR₂), or an azinomethyl radical (—CH=N—N=CH—), an isonitrosomethyl radical (—CH=NOH), a carbamyl radical (—CONH₂) or lower alkyl substituted carbamyl radical (—CONR₂), or a divalent fused nitrogen-containing hetero ring.

The compounds suitable for use in this invention are the phenols of the general formula:

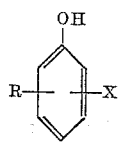

the naphthols of the general formula:

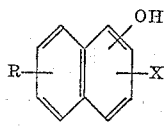

the salicylaldazines of the general formula:

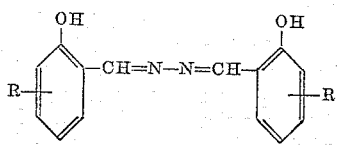

and the quinolinols of the general formula:

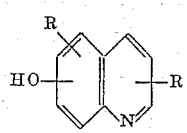

wherein R represents a hydrogen atom or a lower alkyl radical containing up to about 6 carbon atoms; and X represents a nitroso radical, an amino radical, a lower alkyl substituted amino radical, an isonitrosomethyl radical, a carbamyl radical, or a lower alkyl substituted carbamyl radical.

Illustrative of the compounds which can be used to prepare the catalyst complexes of this invention are the 2-, 3-, and 4-aminophenols, 2-amino-4-ethylphenol, 2-amino-6-butylphenol, p-nitrosophenol, 2-methylaminophenol, 1-nitroso-2-naphthol, 2-nitroso-1-naphthol, 4-nitroso-1-naphthol, 6-methyl-1-nitroso-2-naphthol, salicylaldazine, 4,4'-diethylsalicylaldazine, 8-quinolinol, 6-methyl-8-quinolinol, and the like.

The catalyst complexes suitable for use in this invention are prepared by admixing a nickel halide, such as nickel bromide, nickel fluoride, nickel chloride or nickel iodide, with one or more of the above defined hydroxylated compounds. In preparing the catalyst complex the order of addition of the two components is not critical. Thus the hydroxylated compound can be added initially to the alcohol reactant to be used in producing the acrylic acid ester, followed by the nickel halide component, or the reverse order of addition can be followed. The acrylic acid esters are then produced by the interaction of acetylene with carbon monoxide and the alcohol at elevated temperature and under increased pressure in the presence of a catalytic amount the catalyst complex. The use of the catalyst complexes of this invention result in a high ratio of monomer to polymer.

The starting alcohols are preferably the aliphatic monohydroxy saturated alcohols and ether alcohols having up to about 22 carbon atoms and preferably from 1 to about 12 carbon atoms in the molecule. Illustrative alcohols are ethanol, isopropanol, tertiary butanol, pentanol, 2-ethylhexanol, dodecanol, ethylene glycol monomethyl ether, ethylene glycol monoethyl ether, ethylene glycol monobutyl ether, and the like.

The reaction is successfully carried out with the catalyst complexes of this invention at temperatures of from about 90° C. to about 250° C. or higher. Temperatures of from about 100° C. to about 200° C. are preferred. The reaction can be expedited by the use of slight pressures, and we prefer to operate at pressures exceeding about 100 p.s.i.g., with pressures of from about 400 p.s.i.g. to about 500 p.s.i.g. most preferred. Higher pressures up to about 4000 p.s.i.g. to 5000 p.s.i.g. can be used with proper precautions.

The mole ratio of nickel halide to hydroxylated organic compound can be varied over wide limits and does not appear to be critical; nevertheless, we prefer to employ about equimolar amounts of each component. The total amount of catalyst complex charged to the reaction mixture is not critical and can be varied over a wide range, so long as a catalytic amount is present. When based on the alcohol charged, it has been found that a catalyst complex containing about 0.0622 mole each of the nickel halide and the organic hydroxylated compound per 16 moles of alcohol yields the highest conversions from an economical viewpoint. Higher concentrations of catalyst give a faster reaction but at greater cost; while lower concentrations, though more economical, result in lower productivity.

The reaction can be carried out in a batchwise manner or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

*Example 1*

A three-liter stainless steel rocking autoclave was charged with 740 grams of ethanol containing 5.6 grams of mercuric bromide and 9.6 grams of butyl bromide. Then 6.8 grams of nickel bromide and 5.5 grams of 1-nitroso-2-naphthol were added and the autoclave was sealed and purged, first with carbon monoxide and then with a 1:1 mixture, by volume, of acetylene and carbon monoxide. The autoclave was rocked and the pressure was increased to about 40 p.s.i.g. by the further addition of acetylene-carbon monoxide mixture. The gas addition was stopped and the autoclave was heated to 100° C., at which time the pressure was increased 25 p.s.i.g. by the addition of acetylene. The total pressure was then increased to 300 p.s.i.g. with the acetylene-carbon monoxide mixture, and heating was continued to a temperature of about 1500° C. At this point the pressure was increased to 400 p.s.i.g. and maintained between 400 p.s.i.g. to 450 p.s.i.g. by the periodic addition of acetylene-carbon monoxide mixture for 4.3 hours. During this period the temperature was kept between 150° C. to 165° C. The reaction was stopped by air-cooling the autoclave and then releasing the pressure. The reaction mixture was filtered to remove solid materials and the filtrate was distilled to separate monomeric ethyl acrylate, most of which distilled as the ethyl acrylate-ethanol azeotrope, from the higher boiling acrylate esters and polymer-containing residue. The yield of monomeric ethyl acrylate was 471 grams.

*Example 2*

In a manner similar to that described in Example 1, 2-ethylhexyl acrylate is produced by reacting 2,600 grams of 2-ethylhexanol with acetylene and carbon monoxide in the presence of a catalyst complex prepared with 13.6 grams of nickel bromide and 11.0 grams of 1-nitroso-2-naphthol.

*Example 3*

In a manner similar to that described in Example 1, 740 grams of ethanol containing 5.6 grams of mercuric bromide and 9.6 grams of butyl bromide was treated with acetylene and carbon monoxide at 151° C. to 170° C. over a 3.9 hour period in the presence of a catalyst complex prepared from 6.8 grams of nickel bromide and 3.5 grams of o-amino-phenol. The yield of ethyl acrylate was 621 grams.

*Example 4*

In the manner described in Example 1, 740 grams of ethanol was treated with acetylene and carbon monoxide at 160° C. to 174° C. over a 5 hour period in the presence of a catalyst complex prepared from 13.6 grams of nickel bromide and 7.0 grams of o-aminophenol. The yield of ethyl acrylate was 481 grams.

*Example 5*

In the manner described in Example 1, 740 grams of ethanol containing 5.6 grams of mercuric bromide and 9.6 grams of butyl bromide was treated with acetylene and carbon monoxide at 155° C. to 170° C. over a 4.4 hour period in the presence of a catalyst complex prepared from 6.8 grams of nickel bromide and 7.9 grams of salicylaldazine. The yield of ethyl acrylate was 508 grams.

*Example 6*

In the manner described in Example 1, 740 grams of ethanol containing 5.6 grams of mercuric bromide and 9.6 grams of butyl bromide was treated with acetylene and carbon monoxide at 150° C. to 171° C. over a 4 hour period in the presence of a catalyst complex prepared from 6.8 grams of nickel bromide and 4.0 grams of 2-isonitrosomethylphenol (salicylaldoxime). The yield of monomeric ethyl acrylate was 464 grams.

*Example 7*

In the manner described in Example 1, 740 grams of ethanol containing 5.6 grams of mercuric bromide and 9.6 grams of butyl bromide was treated with acetylene and carbon monoxide at 156° C. to 180° C. over a 3.1 hour period in the presence of a catalyst complex prepared from 6.8 grams of nickel bromide and 4.0 grams of salicylamide. The yield of ethyl acrylate was 443 grams.

*Example 8*

In the manner described in Example 1, 740 grams of ethanol containing 5.6 grams of mercuric bromide and 9.6 grams of butyl bromide was treated with acetylene and carbon monoxide at 160° C. to 192° C. over a 4.7 hour period in the presence of a catalyst complex prepared from 6.8 grams of nickel bromide and 14.0 grams of 8-quinolinol to produce ethyl acrylate.

What is claimed is:

1. In the manufacture of an acrylic acid ester by the reaction of acetylene with carbon monoxide and an alcohol at elevated temperature and under increased pressure, the improvement which comprises carrying out said reaction in the presence of a catalyst complex of nickel halide and a member of the group of nitrogen-containing hydroxyl compounds selected from the group consisting of a phenol of the formula:

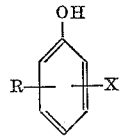

a naphthol of the formula:

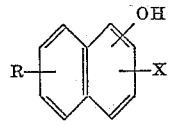

a salicylaldazine of the formula:

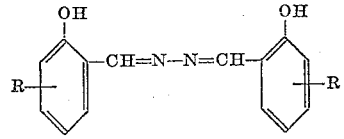

and a quinolinol of the formula:

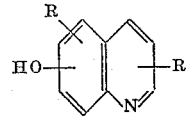

wherein R is a member selected from the group consisting of hydrogen and a lower alkyl radical containing from about 1 to about 6 carbon atoms; and X is a member selected from the group consisting of a nitroso radical, an amino radical, a lower alkyl substituted amino radical, an isonitrosomethyl radical, the carbamyl radical and the lower alkyl substituted carbamyl radical.

2. A method as claimed in claim 1, wherein the reaction is carried out in the presence of 1-nitroso-2-naphthol as the nitrogen-containing hydroxyl compound.

3. A method as claimed in claim 1, wherein the reaction is carried out in the presence of o-aminophenol as the nitrogen-containing hydroxyl compound.

4. A method as claimed in claim 1, wherein the reaction is carried out in the presence of salicylaldazine as the nitrogen-containing hydroxyl compound.

5. A method as claimed in claim 1, wherein the reaction is carried out in the presence of 2-isonitrosomethylphenol as the nitrogen-containing hydroxyl compound.

6. A method as claimed in claim 1, wherein the reaction is carried out in the presence of salicylamide as the nitrogen-containing hydroxyl compound.

7. A method as claimed in claim 1, wherein the reaction is carried out in the presence of 8-quinolinol as the nitrogen-containing hydroxyl compound.

UNITED STATES PATENTS

References Cited in the file of this patent

| | | |
|---|---|---|
| 2,738,364 | Reppe et al. | Mar. 13, 1956 |
| 2,768,968 | Reppe | Oct. 30, 1956 |
| 2,806,040 | Reppe | Sept. 10, 1957 |
| 2,809,976 | Reppe et al. | Oct. 15, 1957 |
| 2,854,458 | Reppe et al. | Sept. 30, 1958 |
| 2,877,252 | Hein | Mar. 10, 1959 |
| 2,886,591 | Lautenschlager et al. | May 12, 1959 |

OTHER REFERENCES

Hieber et al.: Zeitschr. f. anorg. allgem. Chemie, vol. 226, pages 209–221 (1935–1936).

UNITED STATES PATENT OFFICE
CERTIFICATE OF CORRECTION

Patent No. 3,019,256                     January 30, 1962

Jesse T. Dunn

It is hereby certified that error appears in the above numbered patent requiring correction and that the said Letters Patent should read as corrected below.

Column 3, line 20, for "1500° C." read -- 150° C. --.

Signed and sealed this 7th day of August 1962.

(SEAL)
Attest:

ERNEST W. SWIDER
Attesting Officer

DAVID L. LADD
Commissioner of Patents